United States Patent
Shih

(10) Patent No.: US 9,965,367 B2
(45) Date of Patent: May 8, 2018

(54) AUTOMATIC HARDWARE RECOVERY SYSTEM

(71) Applicant: Quanta Computer Inc., Taoyuan (TW)

(72) Inventor: Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 170 days.

(21) Appl. No.: 15/071,474

(22) Filed: Mar. 16, 2016

(65) Prior Publication Data

US 2016/0196194 A1 Jul. 7, 2016

Related U.S. Application Data

(63) Continuation-in-part of application No. 14/708,857, filed on May 11, 2015.

(Continued)

(51) Int. Cl.
*G06F 11/20* (2006.01)
*G06F 11/22* (2006.01)

(Continued)

(52) U.S. Cl.
CPC .......... *G06F 11/2033* (2013.01); *G06F 11/00* (2013.01); *G06F 11/201* (2013.01);

(Continued)

(58) Field of Classification Search
None
See application file for complete search history.

(56) References Cited

U.S. PATENT DOCUMENTS 6,487,623 B1 * 11/2002 Emerson ............ G06F 13/4081
710/302
7,356,636 B2 * 4/2008 Torudbakken ...... G06F 13/4022
710/313

(Continued)

FOREIGN PATENT DOCUMENTS

CN 106155970 A * 11/2016
WO WO 2013075501 A1 * 5/2013 ........... G06F 9/4413

OTHER PUBLICATIONS

'PCI Standard Hot-Plug Controller and Subsystem Specification' Revision 1.0, Jun. 20, 2001.*

(Continued)

*Primary Examiner* — Steven Snyder
(74) *Attorney, Agent, or Firm* — Nixon Peabody LLP; Eduardo J. Quinones; Zhou Lu

(57) ABSTRACT

Systems, methods, and computer-readable storage media for automatic hardware recovery. In some examples, a system can receive a notification of a device failure of a peripheral component interconnect express device associated a node. The system can also receive a first request to disconnect a link between the peripheral component interconnect express device and the node, and a second request to connect, after disconnecting the link, a replacement peripheral component interconnect express device with the node. The system can then reconfigure a peripheral component interconnect express switch fabric to disconnect the link between the peripheral component interconnect express device and the node, and connect the replacement peripheral component interconnect express device with the node.

16 Claims, 11 Drawing Sheets

Related U.S. Application Data

(60) Provisional application No. 62/093,267, filed on Dec. 17, 2014, provisional application No. 62/272,815, filed on Dec. 30, 2015.

(51) Int. Cl.
  *G06F 11/30* (2006.01)
  *G06F 13/40* (2006.01)
  *G06F 13/42* (2006.01)
  *G06F 11/00* (2006.01)

(52) U.S. Cl.
  CPC ........ *G06F 11/221* (2013.01); *G06F 11/3027* (2013.01); *G06F 11/3051* (2013.01); *G06F 13/4022* (2013.01); *G06F 13/4081* (2013.01); *G06F 13/4282* (2013.01)

(56) References Cited

U.S. PATENT DOCUMENTS

| | | | | |
|---|---|---|---|---|
| 7,774,656 B2* | 8/2010 | Hsu | ...................... | G06F 11/0712 714/44 |
| 7,870,417 B2* | 1/2011 | Blinick | ............... | G06F 11/2033 714/11 |
| 8,305,879 B2* | 11/2012 | Gregg | ................. | G06F 11/2094 370/217 |
| 8,677,177 B2* | 3/2014 | Tabuchi | ............... | G06F 11/1441 714/10 |
| 8,904,055 B2* | 12/2014 | Sato | .................... | G06F 13/4022 710/16 |
| 8,949,499 B2* | 2/2015 | Freking | ............... | G06F 13/4081 710/302 |
| 9,087,162 B2* | 7/2015 | Freking | ............... | G06F 13/4081 |
| 9,286,171 B2* | 3/2016 | Cardona | ............. | G06F 11/2033 |
| 9,548,808 B2* | 1/2017 | Buckland | ............. | H04B 10/038 |
| 9,705,591 B2* | 7/2017 | Buckland | ............. | H04B 10/038 |
| 2002/0129186 A1* | 9/2002 | Emerson | ............. | G06F 13/4081 710/302 |
| 2004/0148542 A1* | 7/2004 | McAfee | ............... | G06F 11/2017 714/2 |
| 2006/0242353 A1* | 10/2006 | Torudbakken | ...... | G06F 13/4022 710/316 |
| 2007/0088891 A1* | 4/2007 | Kelly | .................... | H05K 7/1459 710/301 |
| 2008/0239945 A1* | 10/2008 | Gregg | ................. | G06F 11/2005 370/217 |
| 2008/0263255 A1* | 10/2008 | Blinick | ............... | G06F 11/2033 710/314 |
| 2011/0145634 A1* | 6/2011 | Tabuchi | ............... | G06F 11/1441 714/10 |
| 2012/0311221 A1* | 12/2012 | Freking | .................. | G06F 13/20 710/313 |
| 2013/0111075 A1* | 5/2013 | Sato | ........................ | G06F 13/40 710/16 |
| 2013/0219194 A1* | 8/2013 | Gong | .................... | G06F 11/261 713/300 |
| 2013/0346662 A1* | 12/2013 | Freking | .................. | G06F 13/20 710/304 |
| 2015/0370666 A1* | 12/2015 | Breakstone | ......... | G06F 11/2012 714/6.3 |
| 2016/0118121 A1* | 4/2016 | Kelly | .................. | G06F 13/4068 710/301 |
| 2016/0134362 A1* | 5/2016 | Buckland | ............. | H04B 10/038 398/5 |
| 2016/0179735 A1* | 6/2016 | Zou | ..................... | G06F 13/4081 710/302 |

OTHER PUBLICATIONS

'BladeCenter system overview' by D. M. Desai et al., copyright IBM, 2005.*

* cited by examiner

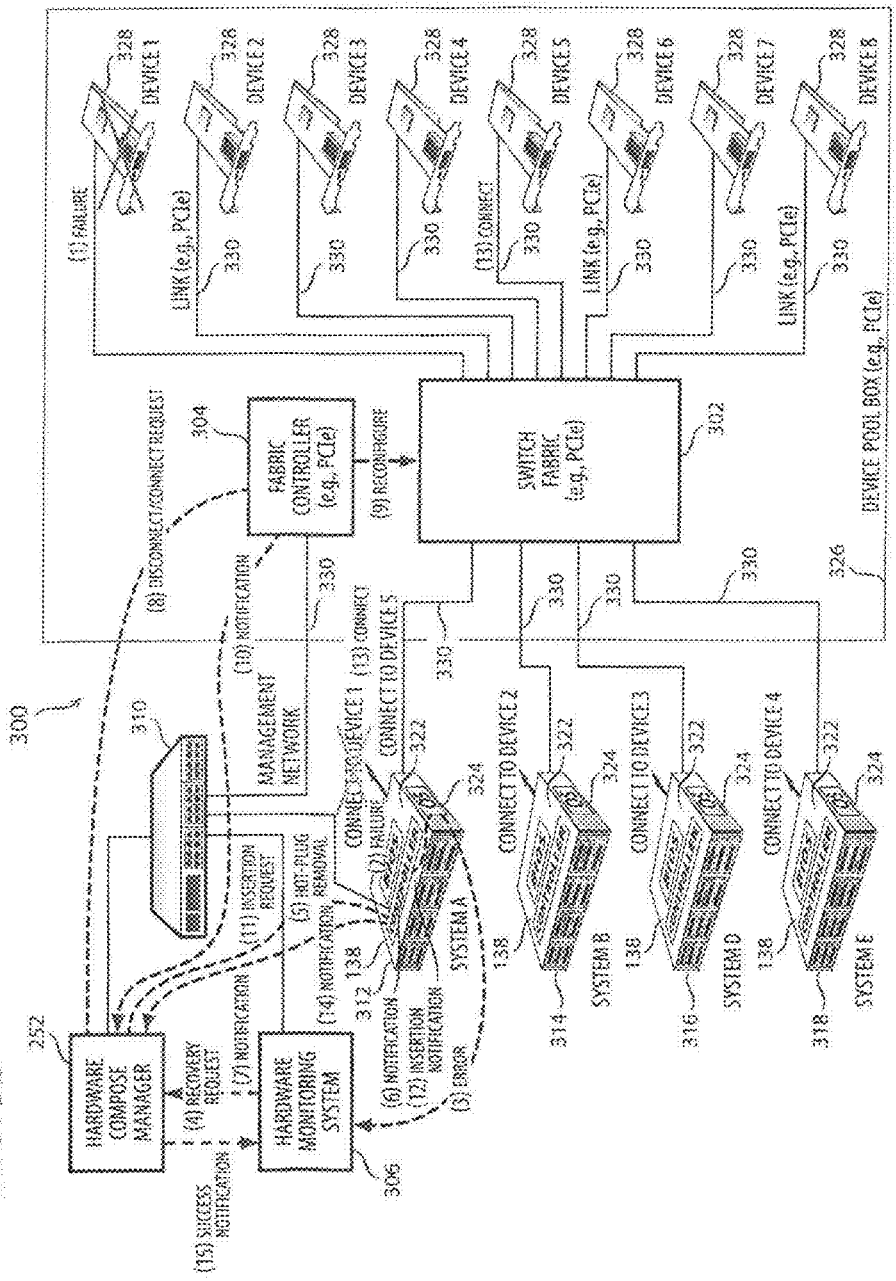

AUTOMATIC HARDWARE RECOVERY SYSTEM

CROSS REFERENCE TO RELATED APPLICATIONS

This application is a continuation-in-part of, and claims the benefit of priority to, U.S. application Ser. No. 14/708,857, filed on May 11, 2015, entitled "METHOD AND SYSTEM FOR HOT-PLUG FUNCTIONS", which claims the benefit of priority to U.S. Provisional Application No. 62/093,267, filed on Dec. 17, 2014, and entitled "HOT-PLUG CONTROL MECHANISM FOR EXTERNAL PCI DEVICE BOX". This application also claims the benefit of and priority to, U.S. Provisional Application No. 62/272,815, filed on Dec. 30, 2015, and entitled "AUTOMATIC HARDWARE RECOVERY SYSTEM", all of which are expressly incorporated by reference herein in their entirety.

TECHNICAL FIELD

The present technology pertains to hardware recovery, and more specifically pertains to automatic hardware recovery systems.

BACKGROUND

The performance and processing capabilities of computers has shown tremendous and steady growth over the past few decades. Not surprisingly, computing systems, such as servers, are becoming more and more complex, often equipped with an increasing number and type of components, such as processors, memories, and add-on cards. Most experts agree this trend is set to continue far into the future.

However, with a growing number and complexity of hardware components, computing systems are increasingly vulnerable to device failures. Indeed, a device failure is a moderately common problem faced by system administrators, particularly in larger, more complex environments and architectures such as datacenters and disaggregated architectures (e.g., Rack Scale Architecture, etc.). Unfortunately, device failures can be very disruptive. For example, device failures can disrupt computing or network services for extended periods and, at times, may even result in data loss.

To correct a device failure, system administrators often have to perform a manual hardware recovery process. This hardware recovery process can include powering down a system or service to replace a failed system component. The overall recovery process can be inefficient and may result meaningful disruptions in service to the users. Moreover, the reliance on user input to complete certain steps of the recovery process can further delay the system's recovery and cause greater disruptions to users.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to perform an automated system recovery. For example, the approaches set forth herein can be used to perform automatic system hardware recovery in a variety of environments and architectures, including disaggregated architectures. The automated system recovery can limit or eliminate the need for manual input from users and greatly reduce any disruptions experienced by users as a result of a hardware failure. Moreover, the automated system recovery can be implemented in architectures that support peripheral component interconnect express (PCIe) hot-plug, universal serial bus (USB) hot-plug, as well as architectures that do not support hot-plug procedures.

Disclosed are systems, methods, and non-transitory computer-readable storage media for automatic hardware recovery. In some configurations, a system can receive a notification of a device failure of a device associated with a node, such as a peripheral component interconnect express or another type of device having hot-plug capabilities. The device failure can be a hardware and/or software failure of the device. Moreover, the device can include any component or extension card, such as a network interface card (NIC), a storage device (e.g., solid state drive), a graphics processing unit (GPU), etc.

Next, the system can receive a first request to disconnect a link between the device (e.g., PCIe device) and the node, and a second request to connect, after disconnecting the link, a replacement device (e.g., replacement PCIe device) with the node. Based on the first and second requests, the system can then reconfigure a device switch fabric (e.g., PCIe switch fabric) to disconnect the link between the device and the node, and connect the replacement device with the node.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3B illustrates a schematic block diagram of a hot-plug mechanism for automatic recovery in an example architecture;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Disclosed are systems, methods, and non-transitory computer-readable storage media for automated hardware recovery. A brief introductory description of example systems and configurations for automated hardware recovery are first disclosed herein. A detailed description of automated hardware recovery, including examples and variations, will then follow. These variations shall be described herein as the various embodiments are set forth. The disclosure now turns to FIGS. 1A and 1B.

Figure 1A:
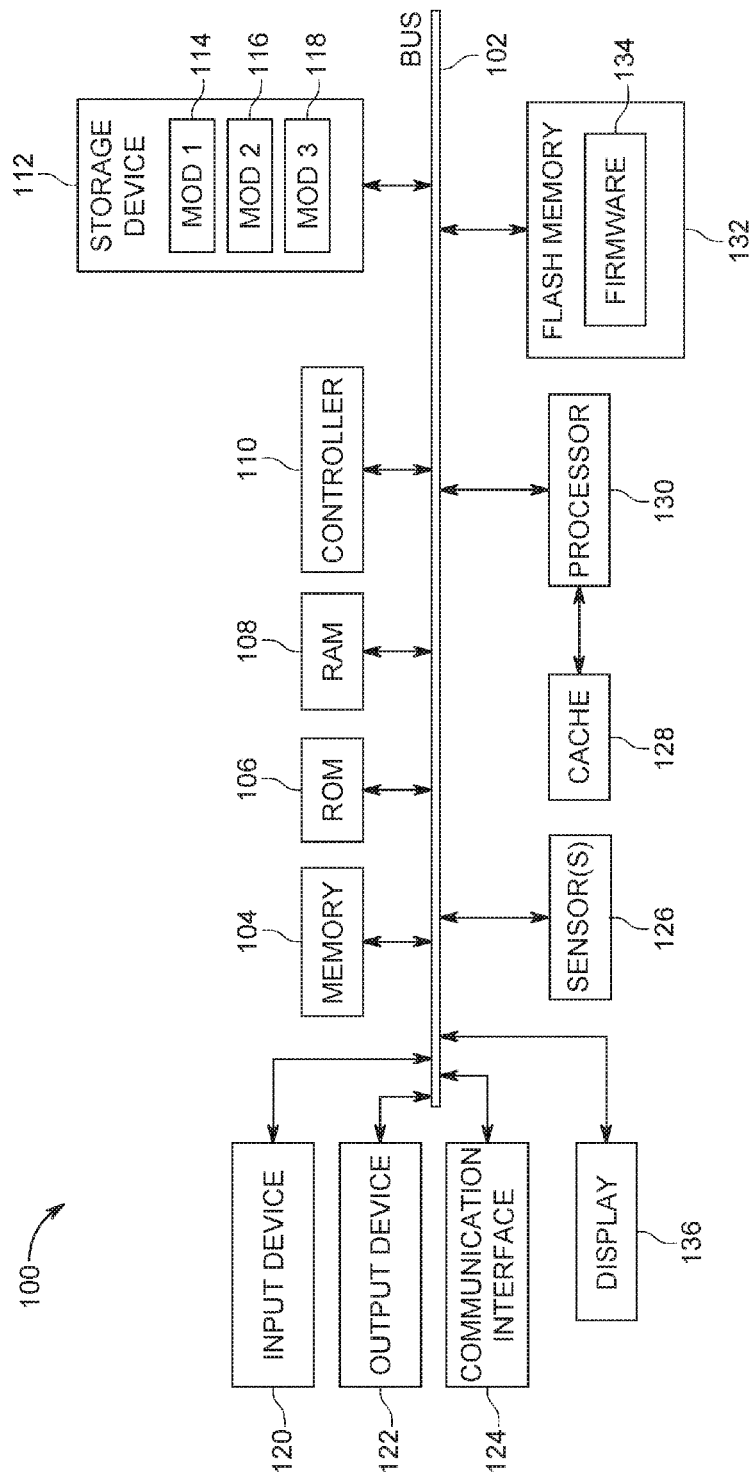
FIGS. 1A-1B illustrate example system embodiments.
Figure 1B:
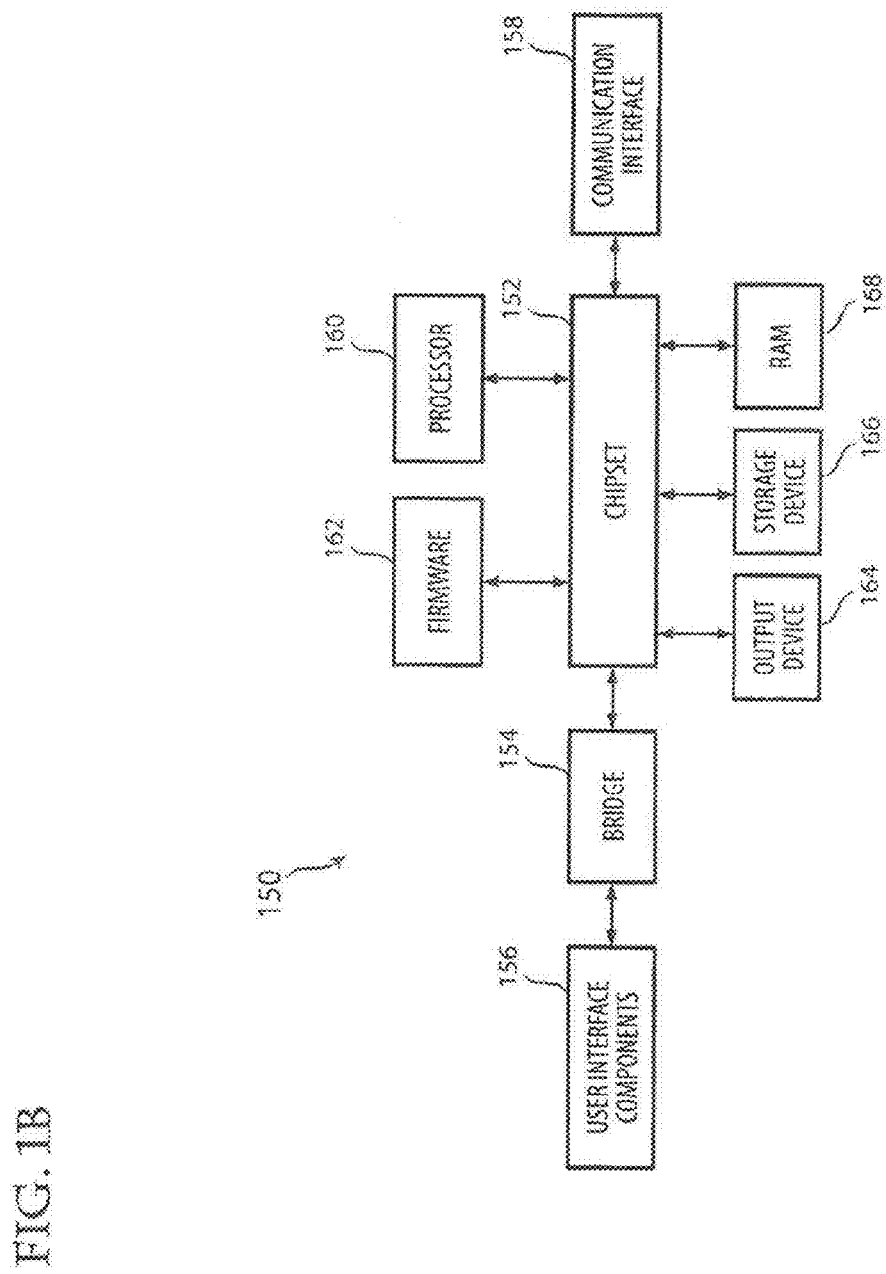

FIGS. 1A and 1B illustrate example system embodiments. The more appropriate embodiment will be apparent to those of ordinary skill in the art when practicing the present technology. Persons of ordinary skill in the art will also readily appreciate that other system embodiments are possible.

FIG. 1A illustrates a system bus computing system architecture 100 wherein the components of the system are in electrical communication with each other using a bus 102. Example system 100 includes a processing unit (CPU or processor) 130 and a system bus 102 that couples various system components including the system memory 104, such as read only memory (ROM) 106 and random access memory (RAM) 108, to the processor 130. The system 100 can include a cache of high-speed memory connected directly with, in close proximity to, or integrated as part of the processor 130. The system 100 can copy data from the memory 104 and/or the storage device 112 to the cache 128 for quick access by the processor 130. In this way, the cache can provide a performance boost that avoids processor 130 delays while waiting for data. These and other modules can control or be configured to control the processor 130 to perform various actions. Other system memory 104 may be available for use as well. The memory 104 can include multiple different types of memory with different performance characteristics. The processor 130 can include any general purpose processor and a hardware module or software module, such as module 1 114, module 2 116, and module 3 118 stored in storage device 112, configured to control the processor 130 as well as a special-purpose processor where software instructions are incorporated into the actual processor design. The processor 130 may essentially be a completely self-contained computing system, containing multiple cores or processors, a bus, memory controller, cache, etc. A multi-core processor may be symmetric or asymmetric.

To enable user interaction with the computing device 100, an input device 120 can represent any number of input mechanisms, such as a microphone for speech, a touch-sensitive screen for gesture or graphical input, keyboard, mouse, motion input, speech and so forth. An output device 122 can also be one or more of a number of output mechanisms known to those of skill in the art. In some instances, multimodal systems can enable a user to provide multiple types of input to communicate with the computing device 100. The communications interface 124 can generally govern and manage the user input and system output. There is no restriction on operating on any particular hardware arrangement and therefore the basic features here may easily be substituted for improved hardware or firmware arrangements as they are developed.

Storage device 112 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 108, read only memory (ROM) 106, and hybrids thereof.

The storage device 112 can include software modules 114, 116, 118 for controlling the processor 130. Other hardware or software modules are contemplated. The storage device 112 can be connected to the system bus 102. In one aspect, a hardware module that performs a particular function can include the software component stored in a computer-readable medium in connection with the necessary hardware components, such as the processor 130, bus 102, display 136, and so forth, to carry out the function.

The controller 110 can be a specialized microcontroller or processor on the system 100, such as a BMC (baseboard management controller). In some cases, the controller 110 can be part of an Intelligent Platform Management Interface (IPMI). Moreover, in some cases, the controller 110 can be embedded on a motherboard or main circuit board of the system 100. The controller 110 can manage the interface between system management software and platform hardware. The controller 110 can also communicate with various system devices and components (internal and/or external), such as controllers or peripheral components, as further described below.

The controller 110 can generate specific responses to notifications, alerts, and/or events and communicate with remote devices or components (e.g., electronic mail message, network message, etc.), generate an instruction or command for automatic hardware recovery procedures, etc. An administrator can also remotely communicate with the controller 110 to initiate or conduct specific hardware recovery procedures or operations, as further described below.

Different types of sensors (e.g., sensors 126) on the system 100 can report to the controller 110 on parameters such as cooling fan speeds, power status, operating system (OS) status, hardware status, and so forth. The controller 110 can also include a system event log controller and/or storage for managing and maintaining events, alerts, and notifications received by the controller 110. For example, the controller 110 or a system event log controller can receive alerts or notifications from one or more devices and components and maintain the alerts or notifications in a system even log storage component.

Flash memory 1132 can be an electronic non-volatile computer storage medium or chip which can be used by the system 100 for storage and/or data transfer. The flash memory 132 can be electrically erased and/or reprogrammed. Flash memory 132 can include erasable programmable read-only memory (EPROM), electrically erasable programmable read-only memory (EEPROM), ROM, NVRAM, or complementary metal-oxide semiconductor (CMOS), for example. The flash memory 132 can store the firmware 134 executed by the system 100 when the system 100 is first powered on, along with a set of configurations specified for the firmware 134. The flash memory 132 can also store configurations used by the firmware 134.

The firmware 134 can include a Basic Input/Output System or its successors or equivalents, such as an Extensible Firmware Interface (EFI) or Unified Extensible Firmware Interface (UEFI). The firmware 134 can be loaded and executed as a sequence program each time the system 100 is started. The firmware 134 can recognize, initialize, and test hardware present in the system 100 based on the set of configurations. The firmware 134 can perform a self-test, such as a Power-on-Self-Test (POST), on the system 100. This self-test can test functionality of various hardware components such as hard disk drives, optical reading devices, cooling devices, memory modules, expansion cards and the like. The firmware 134 can address and allocate an area in the memory 104, ROM 106, RAM 108, and/or storage device 112, to store an operating system (OS). The firmware 134 can load a boot loader and/or OS, and give control of the system 100 to the OS.

The firmware 134 of the system 100 can include a firmware configuration that defines how the firmware 134 controls various hardware components in the system 100. The firmware configuration can determine the order in which the various hardware components in the system 100 are started. The firmware 134 can provide an interface, such as an UEFI, that allows a variety of different parameters to be set, which can be different from parameters in a firmware default configuration. For example, a user (e.g., an administrator) can use the firmware 134 to specify clock and bus speeds, define what peripherals are attached to the system 100, set monitoring of health (e.g., fan speeds and CPU temperature limits), and/or provide a variety of other parameters that affect overall performance and power usage of the system 100.

While firmware 134 is illustrated as being stored in the flash memory 132, one of ordinary skill in the art will readily recognize that the firmware 134 can be stored in other memory components, such as memory 104 or ROM 106, for example. However, firmware 134 is illustrated as being stored in the flash memory 132 as a non-limiting example for explanation purposes.

System 100 can include one or more sensors 126. The one or more sensors 126 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 126 can communicate with the processor, cache 128, flash memory 132, communications interface 124, memory 104, ROM 106, RAM 108, controller 110, and storage device 112, via the bus 102, for example. The one or more sensors 126 can also communicate with other components in the system via one or more different means, such as inter-integrated circuit (I2C), general purpose output (GPO), and the like.

FIG. 1B illustrates an example computer system 150 having a chipset architecture that can be used in executing the described method(s) or operations, and generating and displaying a graphical user interface (GUI). Computer system 150 can include computer hardware, software, and firmware that can be used to implement the disclosed technology. System 150 can include a processor 160, representative of any number of physically and/or logically distinct resources capable of executing software, firmware, and hardware configured to perform identified computations. Processor 160 can communicate with a chipset 152 that can control input to and output from processor 160. In this example, chipset 152 outputs information to output 164, such as a display, and can read and write information to storage device 166, which can include magnetic media, and solid state media, for example. Chipset 152 can also read data from and write data to RAM 168. A bridge 154 for interfacing with a variety of user interface components 156 can be provided for interfacing with chipset 152. Such user interface components 156 can include a keyboard, a microphone, touch detection and processing circuitry, a pointing device, such as a mouse, and so on. In general, inputs to system 150 can come from any of a variety of sources, machine generated and/or human generated.

Chipset 152 can also interface with one or more communication interfaces 158 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 160 analyzing data stored in storage 166 or 168. Further, the machine can receive inputs from a user via user interface components 156 and execute appropriate functions, such as browsing functions by interpreting these inputs using processor 160.

Moreover, chipset 152 can also communicate with firmware 162, which can be executed by the computer system 150 when powering on. The firmware 162 can recognize, initialize, and test hardware present in the computer system 150 based on a set of firmware configurations. The firmware 162 can perform a self-test, such as a POST, on the system 150. The self-test can test functionality of the various hardware components 152-168. The firmware 162 can address and allocate an area in the memory 168 to store an OS. The firmware 162 can load a boot loader and/or OS, and give control of the system 150 to the OS. In some cases, the firmware 162 can communicate with the hardware components 152-160 and 164-168. Here, the firmware 162 can communicate with the hardware components 152-160 and 164-168 through the chipset 152 and/or through one or more other components. In some cases, the firmware 162 can communicate directly with the hardware components 152-160 and 164-168.

It can be appreciated that example systems 100 and 150 can have more than one processor (e.g., 130, 160) or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein.

Figure 2A:
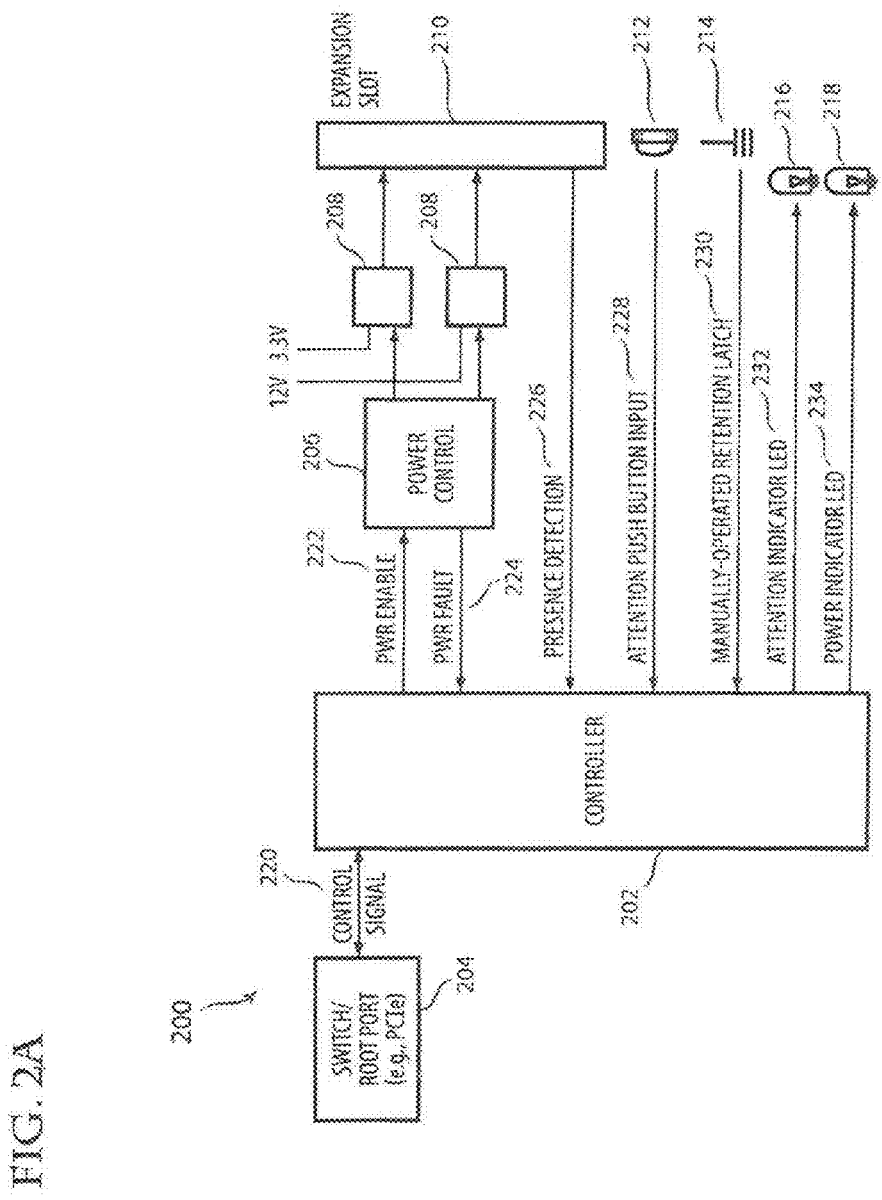
FIG. 2A illustrates a block diagram of an example peripheral component interconnect express system supporting hot-plug operations.

FIG. 2A illustrates a block diagram of an example peripheral component interconnect express (PCIe) system 200 supporting hot-plug operations. The system 200 can support hot add and hot remove operations. The system 200 can include an expansion slot 210 for adding and removing PCIe devices to the system 200. The system 200 can trigger hot add or hot remove operations, as described below, when a device is installed or removed on the expansion slot 210.

Hot Add Operations

The system 200 can support hot add operations as follows. When a PCIe device is inserted into the expansion slot 210, a presence detection 226 signal can be transmitted by the expansion slot 210 to a controller 202 to indicate the PCIe device has been inserted into the expansion slot 210. The controller 202 can be, for example, a PCIe hot-plug controller or an I/O expander (e.g., I2C switch or expander). The controller 202 can interface one or more processors, chipsets, peripherals, and components via a bus or communication channel, such as SMBus (System Management Bus) or I2C bus, for example. In some configurations, the controller 202 can be a complex programmable logic device (CPLD), a field-programmable gate array (FPGA), an electrically erasable programmable read-only memory (EEPROM) switch, or any I/O switch or expander. The controller 202 can communicate control signals 220 to a PCIe switch or root port 204, for managing hot add and remove operations. The PCIe switch or root port 204 can include one or more hot-plug registers, logic, and/or components for controlling, managing, and/or processing hot-plug signals (e.g., PCIe hot-plug signals).

Closing of a manually-operated retention latch 214 when installing the PCIe device can trigger a manually-operated retention latch signal 230 to be transmitted to the controller 202.

Moreover, the system 200 can include an attention button 212 which can be used to trigger a hot add operation. When the attention button 212 is activated, an attention button push input 228 can be transmitted to the controller 202.

Controller 202 can transmit a power indicator signal 234 to activate a power indicator light 218 (e.g., power LED). The power indicator light 218, when activated, can indicate that the system 200 is in a transition state. For example, the power indicator light 218 can blink when activated to indicate a transition state.

Controller 202 can then transmit a power signal 222 to power control module 206, to power the expansion slot 210. MOSFET transistors 208 can be used for switching or amplifying the power signal 222.

A hot-plug driver can cause re-numeration of the bus associated with the expansion slot 210. The system 200 can detect the PCIe device inserted into the expansion slot 210, configure the device, and load any drivers associated with the device.

A power fault condition 224 or an opening of the manually-operated retention latch 214 can transition the PCIe device on the expansion slot 210 to a disabled state. The controller 202 can send an attention indicator signal 232 to activate an attention indicator light 216 (e.g., indicator LED), to indicate an operational problem.

Hot Remove Operations

When an operational problem occurs, the system 200 can perform a hot remove as follows. A hot removal operation can be requested or triggered by activating the attention push button 212. The controller 202 can then communicate the request to a hot-plug driver. The power indicator light 218 can activate to indicate a transition state. The PCIe device in the expansion slot 210 can be taken offline or disconnected. For example, an operating system (OS) of the system 200 can disconnect the PCIe device.

The expansion slot 210 can then be powered off. The power indicator light 218 can also be powered off to indicate that it is safe to physically remove the PCIe device.

A user can open the manually-operated retention latch 214 to remove the PCIe device. Switch signals to the expansion slot 210 can be powered off. The user can then remove the PCIe device, and the presence detection signal 226 can be transmitted to the controller 202 to indicate that the expansion slot 210 is now empty.

Figure 2B:
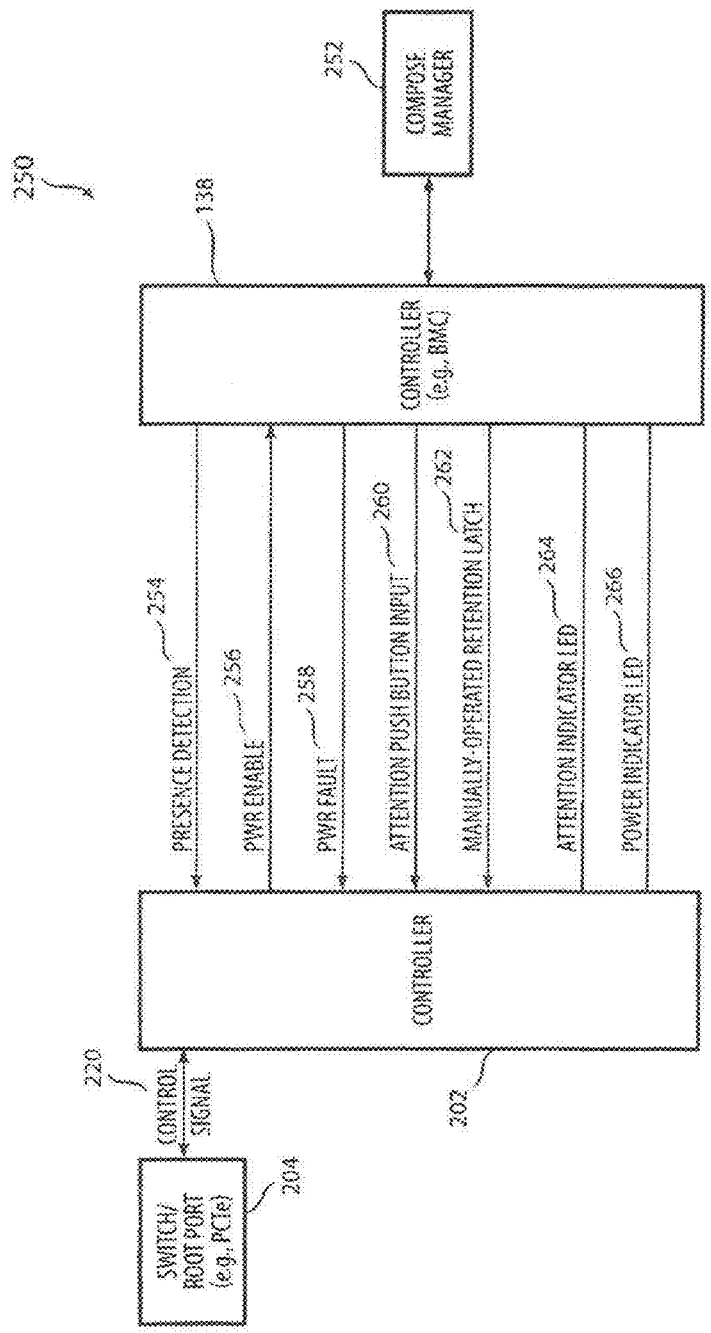
FIG. 2B illustrates a block diagram of an example process for hot-plug operations without user input in a peripheral component interconnect express system.

FIG. 2B illustrates a block diagram of an example process 250 for hot-plug operations without user input in a peripheral component interconnect express (PCIe) system 200. In process 250, controller 138 can receive a request from a hardware compose manager 252 indicating that a PCIe device has been inserted into an expansion slot 210. Controller 138 can be a microcontroller or processor, such as a BMC, for example. The hardware compose manager 252 can be a module or device in a network and/or datacenter that maintains information for the various composed physical machines in the network and/or datacenter.

When the controller 138 receives the request from the hardware compose manager 252, it can then emulate a presence detection signal 254 indicating a presence of the PCIe device in the expansion slot. The controller 138 can also emulate a closing of the manually-operated retention latch 214. Moreover, the controller 138 can receive a power signal 256 from the controller 202 for powering on the expansion slot 210.

The controller 138 can then initiate a hot add operation by sending an attention push button input 228 to the controller 202. The controller 138 can also detect a power indicator signal 266 indicating a transition state of the OS for loading the drivers for the PCIe device. A hot-plug driver can cause re-numeration of the bus of expansion slot 210. The system 200 can then detect and find the PCIe device added, configure the PCIe device, and load its drivers.

A power fault condition 258 or an opening of the manually-operated retention latch 214 can transition the PCIe device on the expansion slot 210 to a disabled state. The controller 202 can send an attention indicator signal 264 to indicate an operational problem to controller 138. The controller 138 can detect the operational problem and initiate a hot remove operation.

For the hot remove operation, the controller 138 can receive a request from hardware compose manager 252 for hot removal of a PCIe device. Controller 138 can emulate an attention push button input 228 and communicate the input 228 to the controller 202. The controller 202 can communicate the request to a hot-plug driver. The controller 138 can detect a power indicator signal 266 indicating a transition state.

The OS can remove or disconnect the PCIe device from system 200. Controller 202 can also power off the expansion slot 210. Controller 138 can notify the hardware compose manager 252 that a hot removal process has successfully completed.

Figure 2C:
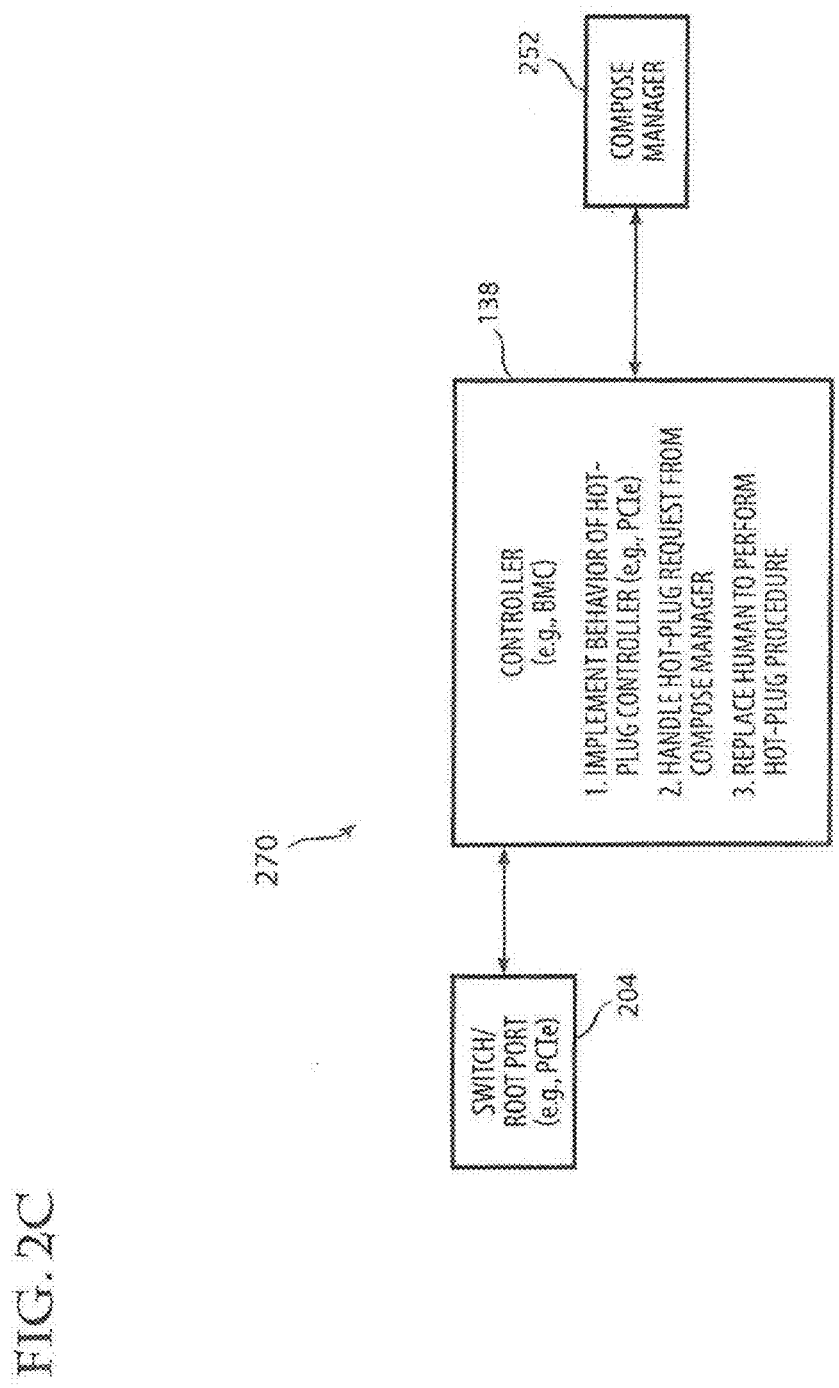
FIG. 2C illustrates a block diagram of an example process for hot-plug operations without user input or a controller in a peripheral component interconnect express system

FIG. 2C illustrates a block diagram of an example process 270 for hot-plug operations without user input or a controller in a peripheral component interconnect express (PCIe) system 200. The controller 138 can receive a request from the hardware compose manager 252 to perform a hot add or hot remove. The controller 138 can then handle the request from the hardware compose manager 252, emulate the behavior of controller 202, as described above with respect to FIG. 2B, and replace user inputs to perform hot-plug procedures.

Figure 3A:
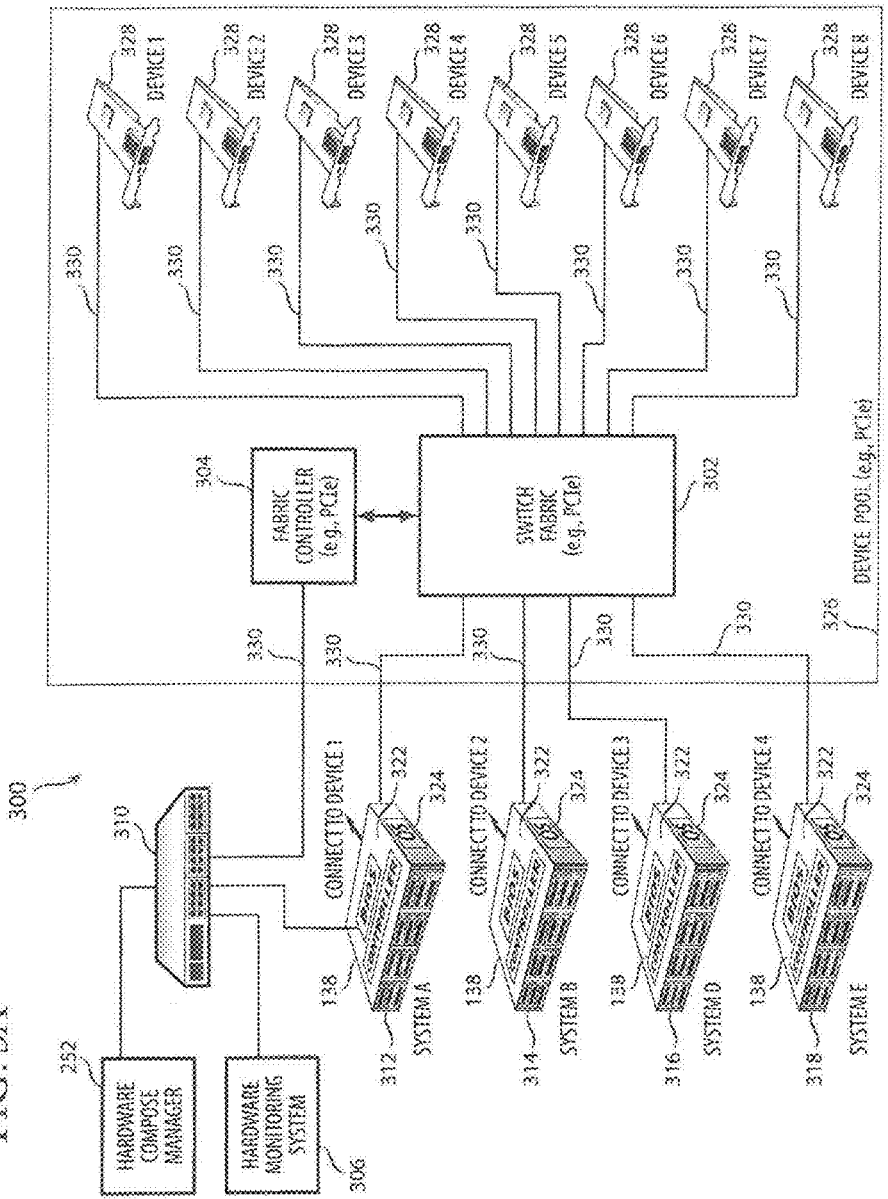
FIG. 3A illustrates a schematic diagram of an example architecture for automatic hardware recovery.

FIG. 3A illustrates a schematic diagram of an example architecture 300 for automatic hardware recovery. The architecture 300 can include systems 312-318. Systems 312-318 can be servers, hosts, or any computing device, such as system 100 illustrated in FIG. 1A. Moreover, systems 312-318 can reside in a datacenter in a network. The network can be a private network, such as a local area network (LAN); a public network, such as the Internet; a distributed network; a hybrid network, such as a network including a private network and a public network; etc.

Systems 312-318 can include respective operating systems (OSs) 324, respective firmware 322 such as basic input/output systems (BIOSs), and respective controllers 138. The operating systems 324, BIOSs 322, and controllers 138 can provide the hardware and software computing environment of the systems 312-318, and can manage and integrate hardware components with software running on the respective systems 312-318. Moreover, the operating system 324, BIOS 322, and controller 138 can perform various functionalities, operations, and/or roles for automatic hardware recovery.

For example, the BIOS 322 can detect hardware errors and notify a controller 138, which can then forward the errors to the hardware monitoring system 306. Similarly, the controller 138 can detect hardware errors on the systems 312-318 and send an indication or log of the detected errors to a hardware monitoring system 306, which is further described below. The controller 138 can also serve as a proxy to send errors to hardware monitoring system 306 from the BIOS 322 and/or operating system 324. Moreover, the controller 138 can provide a hardware control mechanism to replace human input to do a hot-plug procedure.

The operating system 324 can also detect hardware errors and notify the controller 138, which can then forward the errors to the hardware monitoring system 306. The operating system 324 can also detect the hardware errors and send the hardware errors to the hardware monitoring system 306, without necessarily using the controller 138 as a proxy to the hardware monitoring system 306, if, for example, the operating system 324 has a communication path available to the hardware monitoring system 306 for delivering the error notification messages to the hardware monitoring system 306.

The architecture 300 can include a disaggregated architecture. To this end, the architecture 300 can include a device pool 326, which can include various devices 328 for communicatively coupling with the systems 312-318. The devices 328 in the device pool 326 can include any peripheral, I/O, and/or expansion device or component, such as a PCIe device. For example, the devices 328 can include network interface components, solid state drives (SSDs), graphics processing units, expansion cards, etc.

One or more of the devices 328 in device pool 326 can be communicatively coupled with systems 312-318. For example, system 312 can be communicatively coupled with device 1, system 314 can be communicatively coupled with device 2, system 316 can be communicatively coupled with device 3, and system 316 can be communicatively coupled with device 4. Moreover, the device pool 326 can include one or more additional devices, which may not be communicatively coupled with any of the systems 312-318. For example, the device pool 326 can include devices 5-8, which are not communicatively coupled with any of the systems 312-318.

Those of the devices 328 that are not communicatively coupled with any of the systems 312-318 (e.g., devices 5-8), can be available in the device pool 326 for communicatively coupling with any systems 312-318, if necessary. For example, devices 5-8 can be available at the device pool 326 for coupling with the systems 312-318 through an automatic recovery and/or automatic add operation, as further described below. These additional devices (e.g., devices 5-8) can thus provide options for redundancy, fail safe, scalability, growth, upgrading, etc., as will be further explained below.

Devices 328 can be communicatively coupled with the systems 312-318 through a switch fabric 302. Switch fabric 302 can be a bus fabric, such as a PCIe fabric. Moreover, switch fabric 302 can provide the routing and/or switching of bus communications between the systems 312-318 and the devices 328 in the device pool 326. Thus, the switch fabric 302 can provide multi-host communication and I/O sharing capabilities.

Communications between the systems 312-318 and devices 328 in the device pool 326 can be routed through the switch fabric 302 via bus links 330. Further, the routing in switch fabric 302 can be configured by fabric controller 304. Fabric controller 304 can provide the logic, instructions, and/or configuration for routing communications through the switch fabric 302 to connect devices 328 to the systems 312-318.

The systems 312-318 and fabric controller 304 can communicate with a hardware compose manager 252 and hardware monitoring system 306 through a network device 310 (e.g., switch or router). The hardware compose manager 252 can maintain information and data, such as hardware and configuration details, for systems 312-318, as well as any other devices or systems in one or more specific datacenters and/or networks. For example, the hardware compose manager 252 can maintain data indicating which devices 328 are communicatively coupled with which systems 312-318. The hardware compose manager 252 can also maintain data indicating which devices 328 in the device pool 326 are available to be communicatively coupled with systems 312-318.

Furthermore, the hardware compose manager 252 can store install, remove, and/or recovery events and procedures.

For example, the hardware compose manager 252 can maintain information and statistics about any devices added or removed from the systems 312-318, any hardware errors experienced by the systems 312-318, any recovery procedures performed by systems 312-318, any conditions hardware conditions experienced by devices 312-318 and/or devices 328, hardware status information associated with systems 312-318 and devices 328, performance statistics, configuration data, link or routing information, and so forth.

The hardware monitoring system 306 can collect hardware error events in the architecture 300. For example, the hardware monitoring system 306 can collect hardware error or failure events in a datacenter. The hardware monitoring system 306 can also store and/or implement one or more predefined policies for performing error recovery. For example, the hardware monitoring system 306 can implement a predefined policy for performing automatic error recovery when an error or failure is detected on a system (e.g., system 312, system 314, etc.) in a datacenter or network. The error recovery policy can be based on a status, architecture, and/or configuration of the system and/or device associated with the error or failure; a configuration, topology, and/or status of the switch fabric 302; a configuration, status, and/or topology of an associated network or datacenter; a configuration or status of the architecture 300; a software environment or setting (e.g., OS, BIOS, BMC, etc.); a type of error or failure; a bus or I/O standard (e.g., PCIe); any error recovery preferences or requirements; etc. Other non-limiting examples of error recovery policies are further described below.

While the device pool 326 in FIG. 3A shows eight (8) devices, more or less devices and types of devices are contemplated herein. Indeed, one of ordinary skill in the art will readily recognize that the devices 328 in the device pool 326 can include different numbers and types of devices in various embodiments or implementations. However, the eight (8) devices in FIG. 3A are non-limiting examples provided for the clarification and explanation purposed.

In addition, the number and types of elements (e.g., devices, components, links, etc.) in architecture 300, shown in FIG. 3A, are non-limiting examples provided for clarification and explanation purposes. Indeed, as one of ordinary skill in the art will readily recognize, the architecture 300 can include more or less systems, switches, hardware compose managers, hardware monitoring systems, switch fabrics, fabric controllers, datacenters, device pools, and elements. Moreover, the architecture 300 can include different elements than those shown in FIG. 3A, such as different switches, management systems, switch fabrics, fabric controllers, datacenters, device pools, topologies, configurations, communication links, communication and device types or standards, and so forth.

FIG. 3B illustrates a schematic block diagram of a hot-plug mechanism for automatic recovery in the example architecture 300. In this example, a recovery can be performed after a failure (1) of device 1, which is communicatively coupled with system 312. System 312 can detect (2) the failure of device 1, via the controller 138, BIOS 322, or OS 324. The controller 138 or OS 324 can then send an error log (3) to the hardware monitoring system 306.

The hardware monitoring system 306 can then send a recovery request (4) to the hardware compose manager 252. The recovery request can ask the hardware compose manager 252 to perform a hardware recovery procedure to address the failure of device 1.

The hardware compose manager 252 can then send a request to the controller 138 to perform a hot-plug removal procedure (5). The controller 138 can then send a notification (6) to the OS 324 indicating that device 1 will be removed. The notification can be transmitted through a control hot-plug signal, such as a control standard PCIe hot-plug signal. The OS 324 can then send a device removal success signal to the controller 138. The device removal success signal can be transmitted via a hot-plug signal (e.g., PCIe hot-plug signal). After receiving the device removal success signal, the controller 138 can send a notification to the hardware compose manager 252.

The hardware compose manager 252 can then send a disconnect/connect request (8) to the fabric controller 304. The disconnect/connect request can include a first request to disconnect the link 330 between system 312 and device 1, and a second request to connect device 5 to system 312.

Fabric controller 304 can reconfigure (9) the switch fabric 302 to disconnect the link 330 between device 1 and system 312, and connect device 5 to system 312 through link 330.

Switch fabric 302 can notify hardware compose manager 252 that device 5 has been assigned to system 312. Hardware compose manager 252 can send an insertion request (11) to the controller 138. The insertion request can be a request to perform a hot-plug device insertion procedure, such as a PCIe hot-plug insertion procedure.

The controller 138 can then send insertion notification (12) to OS 324, indicating that device 5 was inserted or added. The controller 138 can send the insertion notification to OS 324 via a control PCIe hot-plug signal, for example.

Device 5 can then connect (13) to system 312. Device 5 can connect to system 312 via link 330. Link 330 can be a bus communication link, such as a PCIe bus link.

The controller 138 can send a notification (14) to the hardware compose manager 252, indicating a device insertion success. The controller 138 can send the notification after receiving a device success insertion signal from OS 324 via, for example, a PCIe hot-plug signal.

The hardware compose manager 252 can then send a success notification (15) to hardware monitoring system 306. The success notification can indicate that the automatic hardware recovery was a success.

Figure 3C:
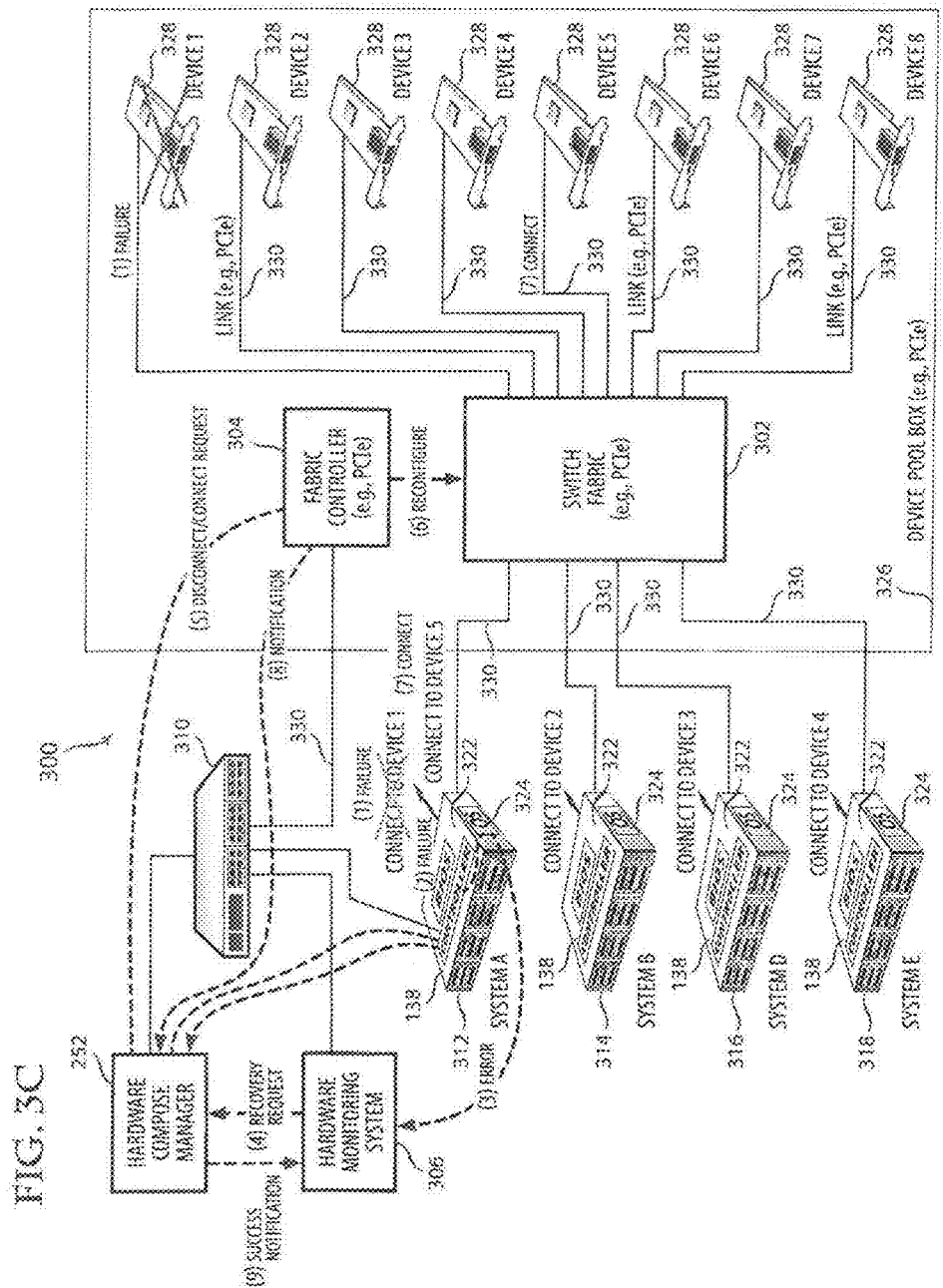
FIG. 3C illustrates a schematic block diagram of a hot-swap mechanism for automatic recovery in an example architecture.

FIG. 3C illustrates a schematic block diagram of a hot-swap mechanism for automatic recovery in the example architecture 300. The automatic recovery can be performed after a failure (1) of device 1, which is communicatively coupled with system 312. System 312 can detect (2) the failure of device 1, via the controller 138, BIOS 322, or OS 324. The controller 138 or OS 324 can then send an error log (3) to the hardware monitoring system 306.

The hardware monitoring system 306 can then send a recovery request (4) to the hardware compose manager 252. The recovery request can ask the hardware compose manager 252 to perform a hardware recovery procedure to address the failure of device 1.

The hardware compose manager 252 can then send a disconnect/connect request (5) to the fabric controller 304. The disconnect/connect request can include a first request to disconnect the link 330 between system 312 and device 1, and a second request to connect device 5 to system 312.

Fabric controller 304 can reconfigure (6) the switch fabric 302 to disconnect the link 330 between device 1 and system 312, and connect device 5 to system 312 through link 330.

Device 5 can then connect (7) to system 312. Device 5 can connect to system 312 via link 330. Link 330 can be a bus communication link, such as a PCIe bus link. Fabric controller 304 can send a notification (8) to hardware compose manager 252 indicating that device 5 has been assigned to system 312.

The hardware compose manager 252 can then send a success notification (9) to hardware monitoring system 306. The success notification can indicate that the automatic hardware recovery was a success.

Figure 4:
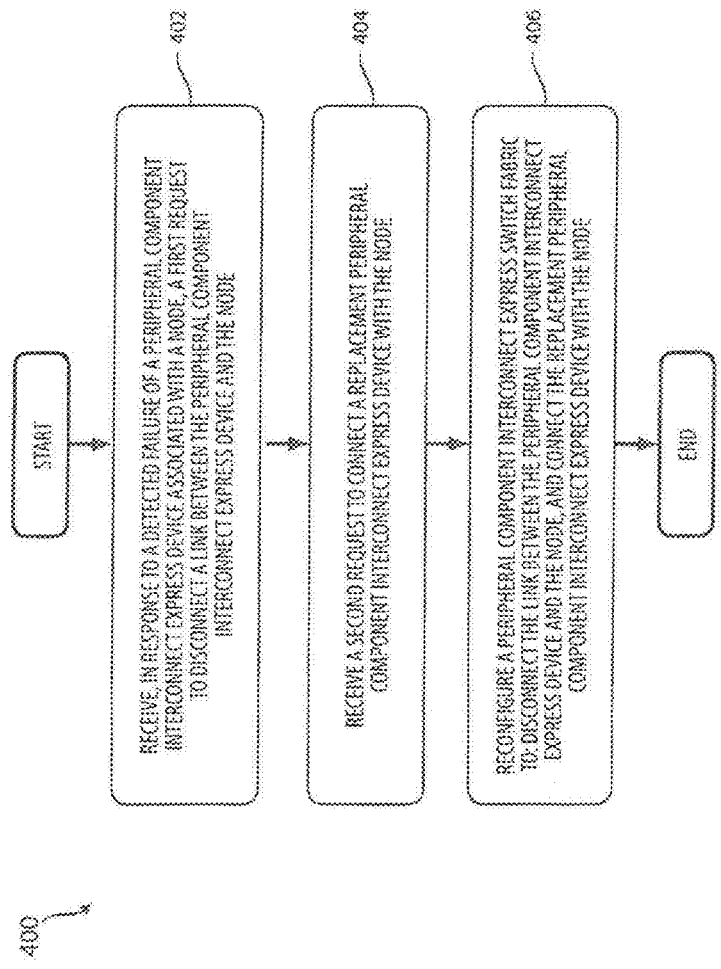
FIG. 4 illustrates an example method for performing an automatic recovery procedure.
Figure 5:
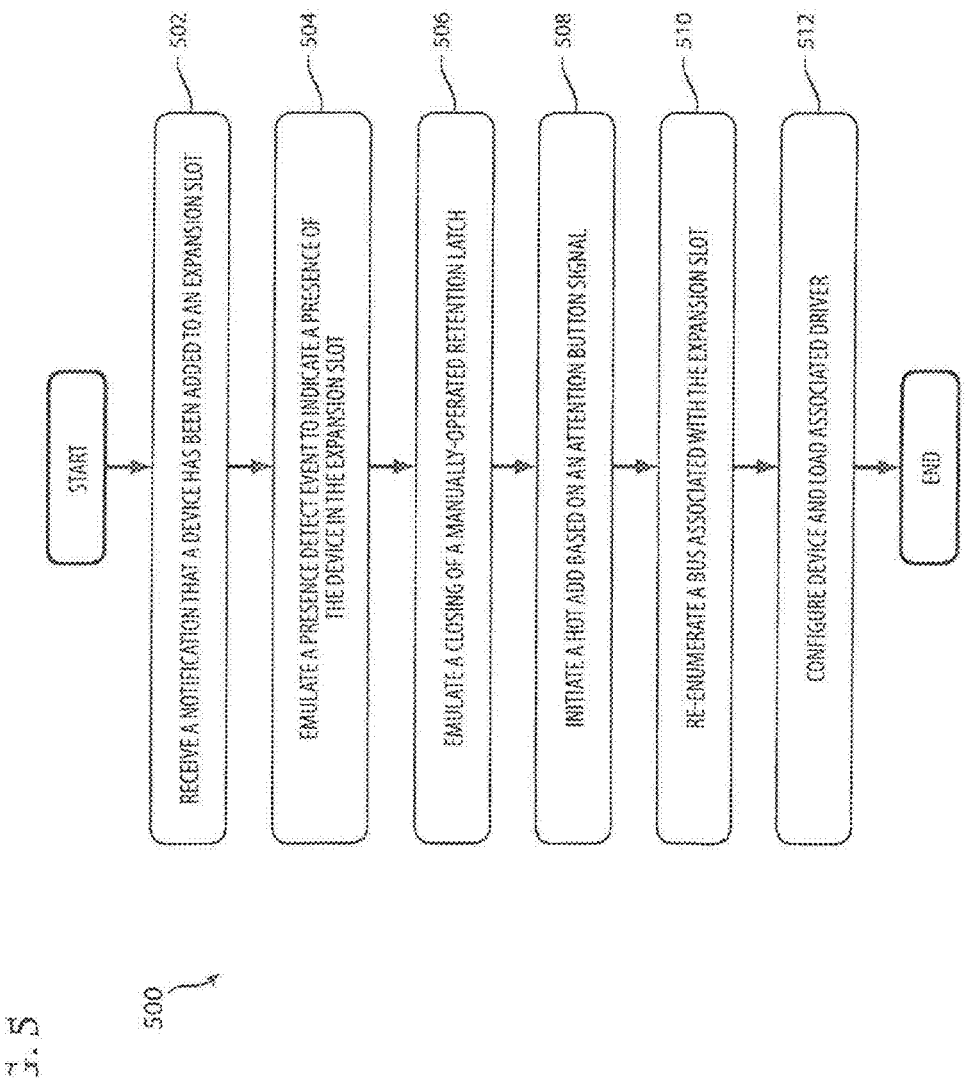
FIG. 5 illustrates an example method for performing a hot add procedure.
Figure 6:
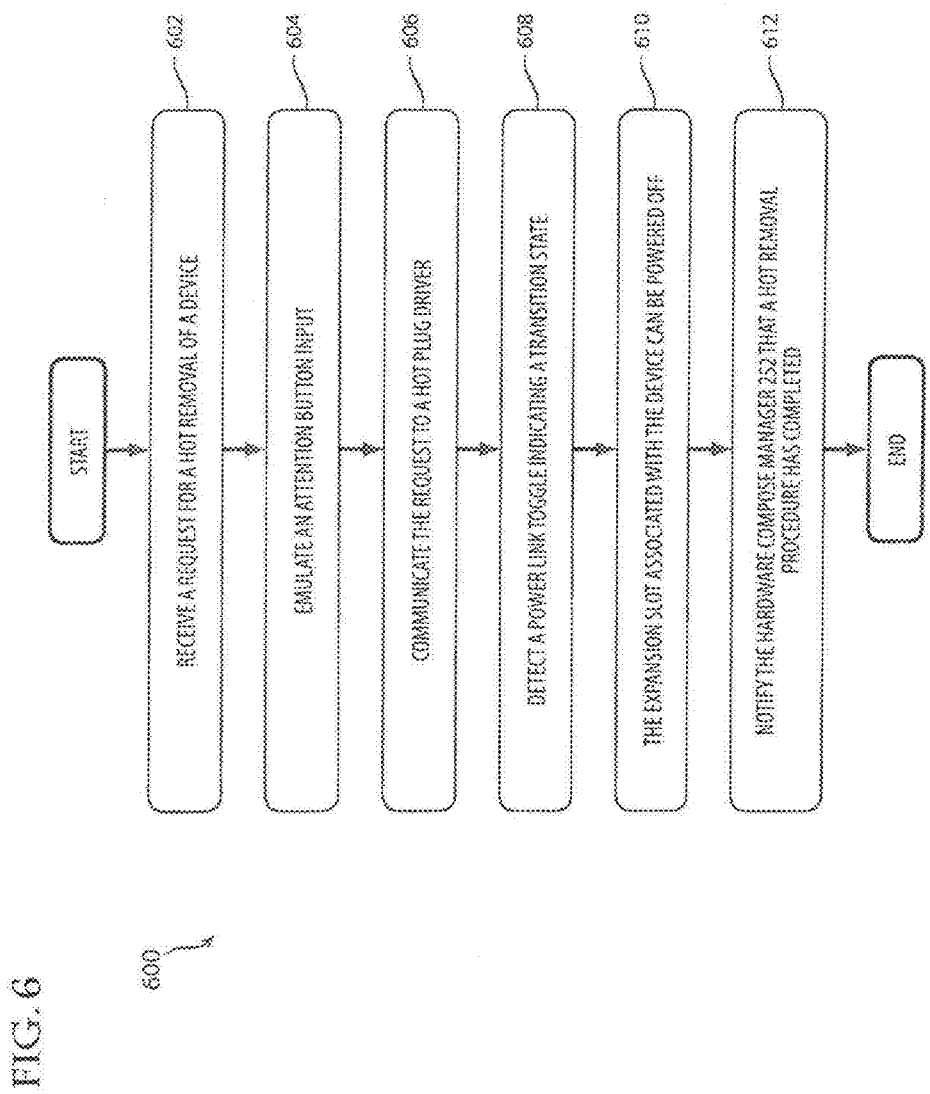
FIG. 6 illustrates an example method for performing a hot removal procedure.

Having disclosed some basic system components and concepts, the disclosure now turns to the example method embodiments shown in FIGS. 4 through 6. For the sake of clarity, the methods are described in terms of fabric controller 304, system 312, controller 138, OS 324, hardware compose manager 252, and hardware monitoring system 306, as shown in FIGS. 3A-C, configured to practice the various steps. The steps outlined herein are exemplary and can be implemented in any combination thereof, including combinations that exclude, add, or modify certain steps.

FIG. 4 illustrates an example method 400 for performing an automatic recovery procedure. At step 402, the fabric controller 304 can receive, in response to a detected failure of a peripheral component interconnect express (PCIe) device associated with a node (e.g., system 312), a first request to disconnect a link between the peripheral component interconnect express device and the node. The request can request a hot-plug removal or recovery procedure, as previously described.

The fabric controller 304 can receive the first request from the hardware compose manager 252. The hardware compose manager 252 can generate the first request based on an instruction to perform a hot-plug device removal procedure, which can be received by the hardware compose manager 252 from the controller 138.

Moreover, the failure of the peripheral component interconnect express device can be detected by system 312 via the controller 138, the BIOS 322, or the OS 324. The detection of the device failure can trigger the removal procedure. For example, the device failure can trigger the controller 138 to send an error log to the hardware monitoring system 306, which can, in response, trigger a request to the hardware compose manager 252 to perform the automatic recovery procedure.

At step 404, the fabric controller can receive a second request to connect a replacement peripheral component interconnect express device (e.g., any of devices 5-8 illustrated in FIG. 3A) with the node (e.g., system 312). The second request can be for a hot-plug device insertion or recovery procedure, as previously described.

At step 406, the fabric controller can reconfigure a peripheral component interconnect express switch fabric (e.g., switch fabric 302) to: disconnect the link (e.g., 330) between the peripheral component interconnect express device (e.g., device 1) and the node (e.g., system 312), and connect the replacement peripheral component interconnect express device (e.g., any of devices 5-8 illustrated in FIG. 3A) with the node.

The replacement peripheral component interconnect express device can then connect to the node. The node can then use the replacement peripheral component interconnect express device as expected. If a failure of the replacement peripheral component interconnect express device is detected, another automatic recovery procedure can be implemented to again replace the replacement peripheral component interconnect express device.

FIG. 5 illustrates an example method 500 for performing a hot-add procedure. At step 502, controller 138 can receive a notification that a device has been added to an expansion slot. The controller 138 can receive the notification from a hardware compose manager 252, for example.

At step 504, the controller 138 can emulate a presence detect event to indicate a presence of the device in the expansion slot.

At step 506, the controller 138 can emulate a closing of a manually-operated retention latch (e.g., MRL 214).

At step 508, the controller 138 can initiate a hot add based on an attention button signal (e.g., attention push button input 228). The controller 138 can also detect a power link toggle indicating a transition state of an OS driver loading.

At step 510, a hot-plug driver can cause re-enumeration of a bus associated with the expansion slot (e.g., a slot bus). At step 512, the device is configured and the associated driver loaded. For example, system 312 can detect or find the device being hot-added and configure the device and load the associated driver.

A subsequent power fault condition or opening of a manually-operated retention latch can transition the device to a disabled state. Hot-plug software can activate an attention LED (light emitting diode) signal (e.g., blink or light the LED signal) to indicate an operational problem that the controller 138 can detect.

A disabled state of the device can trigger a hot remove procedure. FIG. 6 illustrates an example method 600 for a hot removal procedure.

At step 602, the controller 138 can receive a request for a hot removal of a device. The request can be received by the controller 138 from a hardware compose manager 252, for example. At step 604, the controller 138 can emulate an attention button input (e.g., 228 illustrated in FIG. 2A). The attention button input can trigger the hot removal. Moreover, the attention button input can be associated with the particular device to be removed and/or the corresponding expansion slot.

At step 606, a hot plug controller (e.g., controller 302) can communicate the request to a hot plug driver. At step 608, the controller 138 can detect a power link toggle indicating a transition state. The OS 324 can then place the device to be removed offline by, for example, removing or disconnecting the device.

At step 610, the expansion slot associated with the device can be powered off. After the expansion slot is powered off, the controller 138 can also turn off a power link signal to indicate that it is safe to remove the device from the expansion slot. At this point, the device can be removed from the expansion slot.

At step 612, the controller 138 can notify the hardware compose manager 252 that a hot removal procedure has completed. The controller 138 can also de-assert a presence detect signal to indicate that the expansion slot is empty.

For clarity of explanation, the present technology has been described with respect to peripheral component interconnect express devices. However, the methods and concepts according to the above-described examples can be implemented for hardware recovery of other types of devices. Indeed, the concepts described herein can be implemented for hardware recovery, including hot-add and hot-remove, of any device with hot-plug or hot-swap support, such as universal serial bus (USB) devices. Again, peripheral component interconnect express devices are used herein as non-limiting examples for the sake of clarity and explanation purposes.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

What is claimed is:

1. A method comprising:
   receiving, by a fabric controller, a notification of a device failure of a peripheral component interconnect express device associated with a node;
   receiving, by the fabric controller, a first request to disconnect a link between the peripheral component interconnect express device and the node;
   receiving, by the fabric controller, a second request to connect a replacement peripheral component interconnect express device with the node; and
   reconfiguring, by the fabric controller, a peripheral component interconnect express switch fabric to:
   disconnect the link between the peripheral component interconnect express device and the node;
   connect the replacement peripheral component interconnect express device with the node;
   receiving, by a baseboard management controller associated with the node, a notification that the replacement peripheral component interconnect express device has been connected to a slot associated with the node;
   emulating, by the baseboard management controller, a presence detection pin or register to indicate the replacement peripheral component interconnect express device has been connected to the slot associated with the node;
   emulating, by the baseboard management controller, a closing of a manually-operated retention latch; and
   initiating, by the baseboard management controller, a hot-add operation based on a signal associated with an attention button configured to allow a user to input a request for a hot-plug operation, the signal being triggered without the user inputting the request via the attention button.

2. The method of claim 1, wherein the node comprises a server associated with a datacenter having a peripheral disaggregated architecture.

3. The method of claim 1, further comprising:
   detecting the device failure of the peripheral component interconnect express device on the node, wherein the device failure is detected by at least one of a baseboard management controller, a basic input-output system, and an operating system;
   based on the device failure, receiving, by the baseboard management controller, a third request to perform a peripheral component interconnect express device hot-plug device removal procedure;
   sending, by the baseboard management controller to the operating system via a peripheral component interconnect express device hot plug signal, a notification that the peripheral component interconnect express device is to be removed from the node; and
   receiving, by the baseboard management controller from the operating system, an indication that the peripheral component interconnect express device has been removed.

4. The method of claim 3, further comprising:
   receiving, by the baseboard management controller, a fourth request to perform a peripheral component interconnect express hot-plug device insertion procedure;
   in response to the fourth request, sending, by the baseboard management controller to the operating system via a control peripheral component interconnect express hot-plug signal, a notification that the replacement peripheral component interconnect express device is to be connected to the node; and
   receiving, by the baseboard management controller from the operating system, an indication that the peripheral component interconnect express device has been connected.

5. The method of claim 1, wherein the peripheral component interconnect express device and the replacement peripheral component interconnect express device comprise a network interface controller, a graphics processing unit, a storage device, or an expansion card.

6. The method of claim 1, further comprising detecting, by the baseboard management controller, a power link signal indicating a transition state of an operating system driver loading on the node.

7. The method of claim 1, further comprising:
detecting the replacement peripheral component interconnect express device;
loading a hot-plug driver associated with the replacement peripheral component interconnect express device;
re-enumerating a slot bus associated with the node, the re-enumerating being triggered by the hot-plug driver;
configuring the replacement peripheral component interconnect express device.

8. The method of claim 7, further comprising transitioning the peripheral component interconnect express device to a disabled state based on at least one of a power fault condition or an opening of the manually-operated retention latch.

9. The method of claim 1, further comprising:
based on an emulated user activation of an attention button configured to allow a user to input a request for a hot-plug operation of the peripheral component interconnect express device, obtaining, by a baseboard management controller, a request for a hot-removal of the peripheral component interconnect express device;
sending the request for the hot removal to a hot-plug driver associated with the peripheral component interconnect express device;
detecting, by the baseboard management controller, a power link signal indicating a transition state associated with the peripheral component interconnect express device;
disconnecting, by an operating system associated with the node, the peripheral component interconnect express device;
powering off a slot associated with the peripheral component interconnect express device; and
generating a power link signal state indicating that it is safe to physically remove the peripheral component interconnect express device.

10. A system comprising:
a processor; and
a computer-readable storage medium having stored therein instructions which, when executed by a processor, cause the processor to perform operations comprising:
receiving a notification of a device failure of a peripheral component interconnect express device on a node;
receiving a first request to disconnect a link between the peripheral component interconnect express device and the node;
receiving a second request to connect a replacement peripheral component interconnect express device with the node;
reconfiguring a peripheral component interconnect express switch fabric to:
disconnect the link between the peripheral component interconnect express device and the node; and
connect the replacement peripheral component interconnect express device with the node;
receiving, by a baseboard management controller associated with the node, a notification that the replacement peripheral component interconnect express device has been connected to a slot associated with the node;
emulating, by the baseboard management controller, a presence detection pin or register to indicate the replacement peripheral component interconnect express device has been connected to the slot associated with the node;
emulating, by the baseboard management controller, a closing of a manually-operated retention latch; and
initiating, by the baseboard management controller, a hot-add operation based on a signal associated with an attention button configured to allow a user to input a request for a hot-plug operation, the signal being triggered without the user inputting the request via the attention button.

11. The system of claim 10, wherein the node comprises a server in a datacenter having a peripheral disaggregated architecture.

12. The system of claim of claim 10, the computer-readable storage medium storing additional instructions which, when executed by the processor, cause the processor to perform further operations comprising connecting the replacement peripheral component interconnect express device with the node via at least one of an expansion slot and a bus link.

13. The system of claim 10, the computer-readable storage device storing additional instructions which, when executed by the processor, cause the processor to perform further operations further comprising:
receiving, by the baseboard management controller, a fourth request to perform a peripheral component interconnect express hot-plug device insertion procedure;
in response to the fourth request, sending, by the baseboard management controller to the operating system, a notification that the replacement peripheral component interconnect express device is to be connected to the node; and
receiving, by the baseboard management controller from the operating system, an indication that the peripheral component interconnect express device has been connected.

14. The system of claim 10, wherein the peripheral component interconnect express device and the replacement peripheral component interconnect express device comprise a network interface controller, a graphics processing unit, a storage device, or an expansion card.

15. A non-transitory computer-readable storage device having stored therein instructions which, when executed by a processor, cause the processor to perform operations comprising:
receiving a notification of a device failure of a peripheral component interconnect express device on a node;
receiving a first request to disconnect a link between the peripheral component interconnect express device and the node;
receiving a second request to connect, after disconnecting the link, a replacement peripheral component interconnect express device with the node;
reconfiguring a peripheral component interconnect express switch fabric to:
disconnect the link between the peripheral component interconnect express device and the node; and
connect the replacement peripheral component interconnect express device with the node;

receiving, by a baseboard management controller associated with the node, a notification that the replacement peripheral component interconnect express device has been connected to a slot associated with the node;

emulating, by the baseboard management controller, a presence detection pin or register to indicate the replacement peripheral component interconnect express device has been connected to the slot associated with the node;

emulating, by the baseboard management controller, a closing of a manually-operated retention latch; and initiating, by the baseboard management controller, a hot-add operation based on a signal associated with an attention button configured to allow a user to input a request for a hot-plug operation, the signal being triggered without the user inputting the request via the attention button.

16. The computer-readable storage device of claim 15, wherein the node comprises a server in a datacenter having a peripheral disaggregated architecture, and wherein the peripheral component interconnect express device and the replacement peripheral component interconnect express device comprise a network interface controller, a graphics processing unit, a storage device, or an expansion card.

* * * * *